(12) United States Patent
De Jong

(10) Patent No.: US 9,290,369 B2
(45) Date of Patent: Mar. 22, 2016

(54) LIFTING COLUMN FOR LIFTING A LOAD, LIFTING SYSTEM PROVIDED THEREWITH AND METHOD FOR MEASURING A LOAD

(71) Applicant: Stertil B.V., Kootstertille (NL)

(72) Inventor: Jurjen Jan De Jong, Buitenpost (NL)

(73) Assignee: Stertll B.V., Kootstertille (NL)

( * ) Notice: Subject to any disclaimer, the term of this patent is extended or adjusted under 35 U.S.C. 154(b) by 87 days.

(21) Appl. No.: 14/100,499

(22) Filed: Dec. 9, 2013

(65) Prior Publication Data

US 2014/0161568 A1    Jun. 12, 2014

Related U.S. Application Data

(60) Provisional application No. 61/735,102, filed on Dec. 10, 2012.

(30) Foreign Application Priority Data

Dec. 10, 2012    (NL) ...................................... 2009949

(51) Int. Cl.
| | |
|---|---|
| *G01G 3/14* | (2006.01) |
| *B66F 17/00* | (2006.01) |
| *B66F 7/28* | (2006.01) |
| *B66F 3/46* | (2006.01) |
| *B66F 3/00* | (2006.01) |

(Continued)

(52) U.S. Cl.
CPC . *B66F 17/00* (2013.01); *B66F 3/00* (2013.01); *B66F 3/46* (2013.01); *B66F 7/24* (2013.01); *B66F 7/28* (2013.01); *G01G 19/083* (2013.01); *H01G 9/028* (2013.01); *H01G 9/07* (2013.01); *H01G 9/155* (2013.01); *H01G 17/00* (2013.01); *H02N 2/18* (2013.01)

(58) Field of Classification Search
CPC .. B62B 2203/50; B66F 17/00; G01G 19/083; H01L 41/042; H01L 41/1132; H01M 10/46; H02J 7/345; H02N 2/18; Y02E 60/13
USPC .......... 177/140, 141, 146; 187/203, 210, 219, 187/290; 254/2 B, 2 C, 2 R, 4 B, 7 B, 93 H, 254/9 B; 280/43.2, 43.23; 310/311, 312, 310/317; 320/166; 322/24, 44; 414/21, 427, 414/458
See application file for complete search history.

(56) References Cited

U.S. PATENT DOCUMENTS 3,875,481 A * 4/1975 Miller et al. ................ 361/283.1
4,712,423 A * 12/1987 Siffert et al. .................... 73/146

(Continued)

FOREIGN PATENT DOCUMENTS

| | | | | |
|---|---|---|---|---|
| DE | 2937582 A | * | 4/1981 | ................ B66F 7/28 |
| DE | 102010015115 A1 | | 10/2011 | |

(Continued)

*Primary Examiner* — Gregory Adams
(74) *Attorney, Agent, or Firm* — The Webb Law Firm

(57) ABSTRACT

Disclosed is a lifting column for lifting a load, such as a vehicle, which includes a frame with a movable carrier and a drive which acts on the carrier; control means for control of the drive; a carrying part attached to the carrier for carrying the load; weight measuring means attached to the carrying part for measuring the weight of the load; and communication means for communicating a measurement signal of the weight measuring means indicative of the weight of the load to the control means.

12 Claims, 7 Drawing Sheets

(51) Int. Cl.
  *B66F 7/24* (2006.01)
  *G01G 19/08* (2006.01)
  *H01G 9/028* (2006.01)
  *H01G 17/00* (2006.01)
  *H01G 9/00* (2006.01)
  *H02N 2/18* (2006.01)
  *H01G 9/07* (2006.01)

(56) References Cited

U.S. PATENT DOCUMENTS

| | | | |
|---|---|---|---|
| 4,838,089 A * | 6/1989 | Okada et al. | 73/727 |
| 5,911,408 A * | 6/1999 | Berends et al. | 254/2 B |
| 5,932,809 A * | 8/1999 | Sparks et al. | 73/727 |
| 5,975,495 A | 11/1999 | Berends et al. | |
| 6,315,079 B1 | 11/2001 | Berends et al. | |
| 6,505,815 B1 | 1/2003 | Dellamore | |
| 6,817,449 B2 | 11/2004 | Berends | |
| 6,855,894 B1 * | 2/2005 | Van Seumeren | 177/130 |
| 6,989,677 B2 * | 1/2006 | Morimoto | 324/660 |
| 7,159,471 B2 * | 1/2007 | Fortune et al. | 73/780 |
| 7,500,816 B2 | 3/2009 | Berends et al. | |
| 7,644,628 B2 * | 1/2010 | Harish | 73/780 |
| 7,692,411 B2 * | 4/2010 | Trainor et al. | 320/166 |
| 7,705,251 B2 * | 4/2010 | Herrmann | 177/211 |
| 7,859,171 B2 * | 12/2010 | Micallef | 310/339 |
| 8,191,865 B2 | 6/2012 | Polins et al. | |
| 8,246,008 B2 | 8/2012 | De Jong et al. | |
| 8,251,184 B2 | 8/2012 | De Jong | |
| 8,567,761 B2 | 10/2013 | De Jong et al. | |
| 2004/0046484 A1 * | 3/2004 | Schiller | 310/317 |
| 2004/0200644 A1 * | 10/2004 | Paine et al. | 177/136 |
| 2005/0045429 A1 | 3/2005 | Baker | |
| 2005/0097973 A1 * | 5/2005 | Waidner et al. | 73/862.454 |
| 2006/0182563 A1 | 8/2006 | De Jong et al. | |
| 2007/0022829 A1 * | 2/2007 | Speckhart et al. | 73/862.454 |
| 2009/0138126 A1 * | 5/2009 | Marsh et al. | 700/279 |
| 2009/0309440 A1 * | 12/2009 | Lieberman | 310/90.5 |
| 2010/0066278 A1 * | 3/2010 | De Jong | 318/376 |
| 2010/0126780 A1 * | 5/2010 | Inoue et al. | 177/1 |
| 2011/0127090 A1 * | 6/2011 | Vijayaraghavan et al. | 177/133 |
| 2011/0131838 A1 * | 6/2011 | Pas et al. | 36/140 |
| 2014/0291043 A1 * | 10/2014 | Izumo et al. | 177/253 |

FOREIGN PATENT DOCUMENTS

| | | |
|---|---|---|
| EP | 1674422 A1 | 6/2006 |
| WO | 9830488 A1 | 7/1998 |
| WO | 2011069599 A1 | 6/2011 |

* cited by examiner

LIFTING COLUMN FOR LIFTING A LOAD, LIFTING SYSTEM PROVIDED THEREWITH AND METHOD FOR MEASURING A LOAD

CROSS-REFERENCE TO RELATED APPLICATIONS

This application claims priority to U.S. Provisional Patent Application No. 61/735,102 and The Netherlands Patent Application No. 2009949, both filed Dec. 10, 2012, the disclosures of which are hereby incorporated by reference in their entirety

BACKGROUND OF THE INVENTION

1. Field of the Invention

The present invention relates to a lifting column for lifting a load, such as a vehicle. Such lifting columns are in particular used for lifting motor vehicles including buses and trucks and may relate to lifting columns of the two-post lift type with pivoting support arms, the four-post lift type with runways, the mobile type etc.

2. Description of Related Art

A lifting column known from practice comprises a frame with a carrier that is connected to a drive for moving the carrier upwards and downwards. In the ascent mode hydraulic oil is pumped to a cylinder for lifting the carrier, and thereby the vehicle. In the descent mode the carrier with the vehicle is lowered and hydraulic oil returns to the reservoir. Lifting columns are designed for a maximum load. Lifting a load with a weight above this maximum leads to unsafe operation of the lifting columns possibly causing accidents with the risk of operators getting injured and vehicles and equipment getting damaged.

The present invention has for its object to provide a lifting column obviating or at least reducing the aforementioned problems.

SUMMARY OF THE INVENTION

This objective is achieved with a lifting column for lifting a load, such as a vehicle, according to the present invention, the lifting column comprising:
 a frame with a movable carrier and a drive which acts on the carrier;
 control means for control of the drive;
 a carrying part attached to the carrier for carrying the load;
 weight measuring means attached to the carrying part for measuring the weight of the load; and
 communication means for communicating a measurement signal of the weight measuring means indicative of the weight of the load to the control means.

By providing the carrying part of the lifting column with weight measuring means, the weight of a load can be measured. More specifically, the weight of a vehicle that is lifted by the lifting column is measured. The communication means communicate a measurement signal that is determined by the weight measurement means and is indicative for the weight of the load that is lifted to the control means. Preferably, the central controller is part of these control means.

The lifting column according to the invention may relate to lifting columns of the two-post lift type with pivoting support arms, the four-post lift type with runways, the mobile type etc.

By providing the controller with weight information of the load the (central) controller knows that a vehicle is present on the carrying part of the carrier. For example, in case of a mobile lifting column the controller may prevent moving the lifting column and/or selecting the lifting column for another group. Furthermore, the controller may perform a check to see whether the weight of the vehicle is below the allowed maximum weight for the specific lifting column, thereby preventing an overload situation. In addition, this check may establish a safety check whether the vehicle is placed correctly relative to the lifting column.

In a presently preferred embodiment the control means that are configured for control of the drive directly or indirectly receive information from the weight measuring means, such as a load sensor. This information is indicative for an authorization to proceed with the lifting operation and/or a command to abort the lifting operation, for example due to a detection of an overload or misalignment of the vehicle on the lifting column. The information from the weight measuring means is preferably received and treated by a central controller. The central controller provides an individual lifting column of a set of lifting columns with the relevant commands, for example for the drive thereof, optionally through the use of an individual controller of a lifting column.

Weight measuring means convert a force caused by the weight of the vehicle that is lifted into an electrical signal. A possible embodiment of the weight measuring means comprises a so-called Wheatstone bridge configuration. For heavier loads an embodiment using a cylinder may be used. Such embodiment enables measuring the deformation as the effective electrical resistance is changed due to the load. Alternative embodiments include the use of piezo-electric load cells and capacitive load cells using a change of the capacitance of the capacitor as indication of the weight of the load. In a presently preferred embodiment the weight measuring means comprise a rubber pad filled with a fluid or gel. The pressure inside the pad is measured with a pressure sensor and represents a measure for the weight. This embodiment can be applied to a lifting column of the two-post lift type. In an alternative embodiment that can be applied to a lifting column of the four-post lift type the pad is positioned under the runways, preferably at or close to one of both outer ends thereof.

The communication means may involve the use of cables connecting the lifting column to a central controller enabling exchange of data representing the measurement signal of the weight measuring means and/or operating instructions, for example.

Preferably, the communication means comprise a transmitter and receiver for wireless communication between the weight measuring means and the control means. The use of wireless communication means may involve the use of Bluetooth, Wi-Fi and/or Ultra Wide Band, for example. Wireless communication prevents the use of cables across the workshop. This improves safety and flexibility for the users of the system. In case the lifting column is a mobile lifting column a battery can be provided to improve the flexibility of the overall lifting system even further. This is especially beneficial for the two-post lifting system with moveable arms.

In a presently preferred embodiment according to the present invention the weight measuring means comprise an energy supply.

By providing an energy supply the weight measuring means can collect measurement data and transfer the measurement signal to the (central) controller without requiring a separate energy supply. The use of a specific energy supply for the measurement means enables performing the measurement and communicating the data autonomously. By providing the energy supply together with the measuring means to the carrier, and more specifically to the carrying part thereof, energy supply cables can be omitted from the lifting system.

Preferably, the energy for the weight measuring means is provided by the vehicle to be lifted. More specifically, the energy is delivered by gravity when lifting the vehicle. This prevents any requirements for external equipment to provide energy.

In a presently preferred embodiment according to the present invention the weight measuring means comprise a piezo-element for generating energy for the energy supply. When a vehicle is positioned on the carrying part, the piezo-element generates a small amount of energy that can be used for the energy supply to the weight measuring means for performing a measurement and communicating a measurement signal to the controller via the communication means. Energy is provided by the vehicle to be lifted, more specifically by gravity when lifting the vehicle. Therefore, no cables and/or external energy sources are required.

In a presently preferred embodiment the energy supply comprises an energy collector for storing the generated energy. This enables storage of energy to be used at the appropriate moment, for example to transfer data via the communication means to the control means. In a presently preferred embodiment the energy collector comprises a capacitor to (temporarily) store energy for use by the weight measuring means and/or the communication means associated therewith.

In a further preferred embodiment according to the present invention the energy supply comprises electromagnetic means for wireless transfer of energy to the weight measuring means.

By providing electromagnetic means an electromagnetic field can be achieved. Preferably, the field is operated by the (central) controller. This enables providing the weight measuring means with energy for performing the weight measurement including transferring data with the communication means to the control means. This enables a standalone weight measurement that in a presently preferred embodiment is integrated in the central controller.

Preferably, the control means comprise operating means for controlling the electromagnetic means. This enables the control means to activate the measurement when required, for example when starting a lifting movement. This results in an energy efficient system.

Preferably, the control means are configured for control of a lifting column or components thereof. In a presently preferred embodiment the control means involve a controller of a first lifting columns acting as master or central controller, and controllers of further lifting columns belonging to the same set of lifting columns acting as slave or local controllers. It will be understood that other configurations of the control means according to the invention are possible. The control means are preferably configure to activate the measurement, receive and treat the measurement data, and send commands to the lifting column(s) and/or components thereof. Next to sending commands and controlling the lifting operation the control means may provide an indication of the load or weight that is measured to the user, operator, driver, or other person. This indication may involve a visual indication that is provided on a display, such as a touch screen, of the control means. Other indication including sound signal may also be applied, for example when an overload is detected.

The invention further relates to a lifting system comprising one or more lifting columns as described above.

Such a lifting system provides the same effects and advantages as those stated with reference to the lifting column. The lifting system preferably uses two, four, six, or even more lifting columns, operating in pairs. Preferably, the control means comprise safety means that are activated when the measurement signal indicates an overweight. This provides additional safety to the lifting system.

The invention furthermore relates to a load sensor for measuring a load on a lifting column and/or lifting system.

Such load sensor provides the same effects and advantages as those stated with reference to the lifting column and/or lifting system. Preferably, the sensor can be used in a lifting system and/or lifting column described above. In a preferred embodiment the load sensor according to the invention comprises an energy generator and/or an energy collector to provide a stand-alone sensor. Preferably the sensor shares its findings with a controller or control system to provide additional safety checks, for example checking an overload.

The invention furthermore also relates to a method for measuring a load on a lifting column, the method comprising:

providing a lifting system with a number of lifting columns as described above; and measuring the load.

Such method provides the same effects and advantages as those stated with reference to the lifting column and/or lifting system. Preferably, the method uses the load sensor according to the invention as described earlier. Preferably, the measurement data is provided to the control means, such as the central controller, for example. This enables checking the position of a vehicle relative to a lifting column preventing damage to the columns by an overload and/or providing additional safety to a lifting operation.

BRIEF DESCRIPTION OF THE DRAWINGS

Further advantages, features and details of the invention are elucidated on the basis of preferred embodiments thereof, wherein reference is made to the accompanying drawings, in which.

DESCRIPTION OF THE INVENTION

Figure 1:
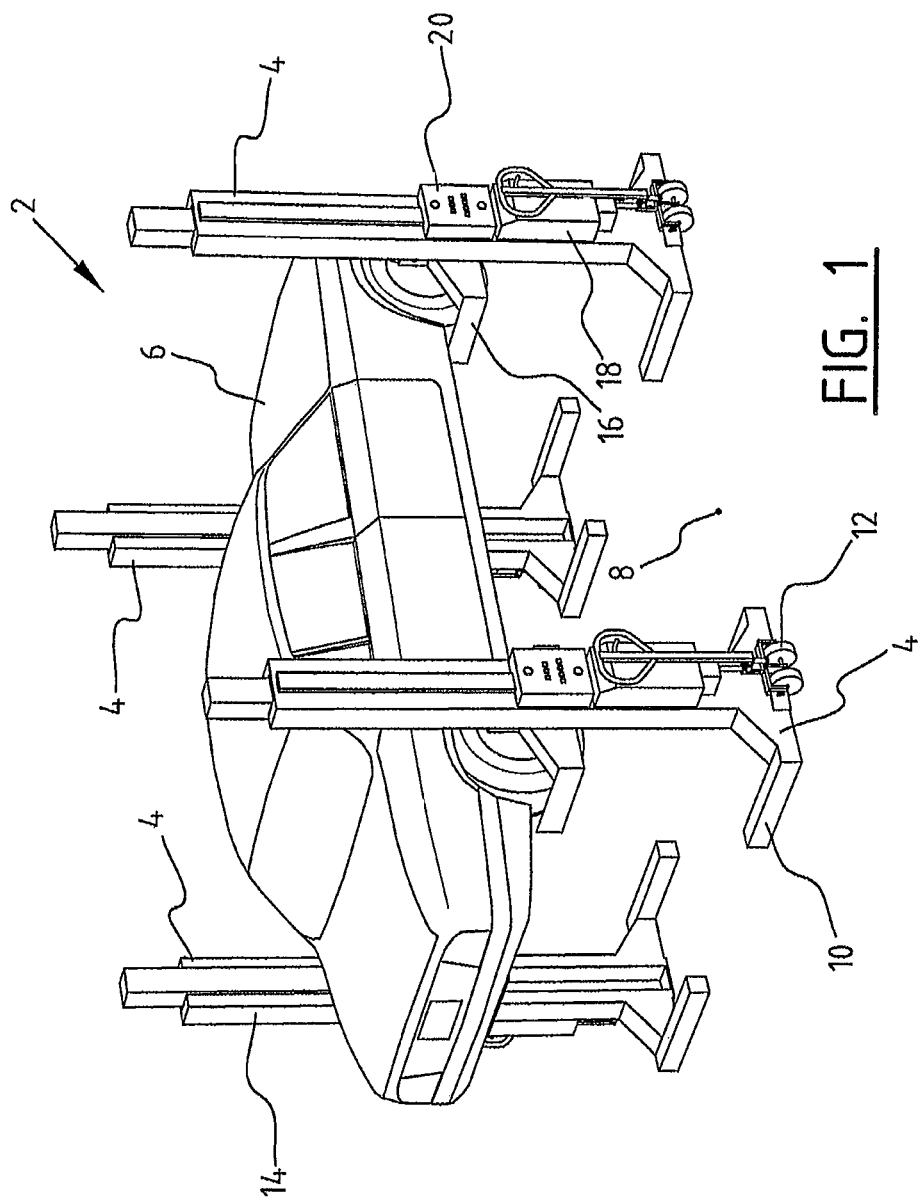
FIG. 1 shows a schematic overview of a vehicle lifted by lifting columns according to the invention.

A system 2 for efficient lifting and lowering a load (FIG. 1) comprises four mobile lifting columns 4 in the illustrated embodiment. Lifting columns 4 lift a passenger car 6 from the ground 8. Lifting columns 4 are connected to each other and/or a control system by wireless communication means or alternatively by cables. Lifting columns 4 comprise a foot 10 which can travel on running wheels 12 over ground surface 8 of for instance a floor of a garage or workshop. In the forks of foot 10 is provided an additional running wheel (not shown). Lifting column 4 furthermore comprises a mast 14. A carrier 16 is moveable upward and downward along mast 14. Carrier 16 is driven by a motor 18 that is provided in a housing of lifting column 4. Motor 18 is supplied with power from the electrical grid or by a battery that is provided on lifting column 4 in the same housing as motor 18, or alternatively on foot 10 (not shown). Control panel 20 is provided to allow the user of system 2 to control the system, for example by setting the speed for the carrier 16.

A column 22 (FIG. 2) of a lifting system 24 is a mobile lifting column that communicates by transmitter-receiver 26 to a transmitter-receiver 28 of a central controller 30. A connection 32 to the electrical grid is provided on a side wall 33 in the neighbourhood of controller 30. Sensor 34 is capable of measuring a load of vehicle 6 carried by carrying part 36. The resulting measurement signal is communicated via transmitter 38 to transmitter-receiver 28 of controller 30 directly or indirectly through transmitter-receiver 26. Controller 30 may send data to lifting column 22 such as an activation signal for sensor 34 using transmitter-receiver 28 and receiver 40. It will be understood that transmitters and/or receivers 26, 38, 40 can be combined or separated. In the illustrated embodiments sensor 34 is a piezo-electric sensor.

In an alternative embodiment a lifting column 42 of lifting system 44 (FIG. 3) comprises load sensor 46. Energy supply system 48 comprises a piezo-element 50 that generates energy when a load is positioned over carrying part 36. The energy is stored in capacitor 52 that is used to transmit data to controller 30.

Figure 4A:
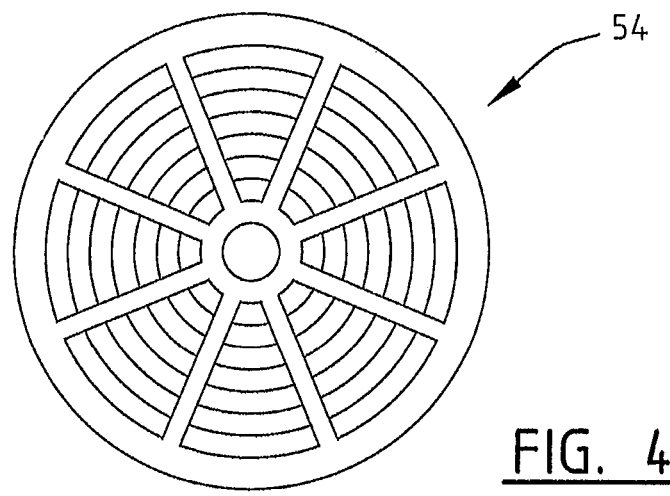
FIG. 4A-B shows a load sensor according to the invention.
Figure 4B:
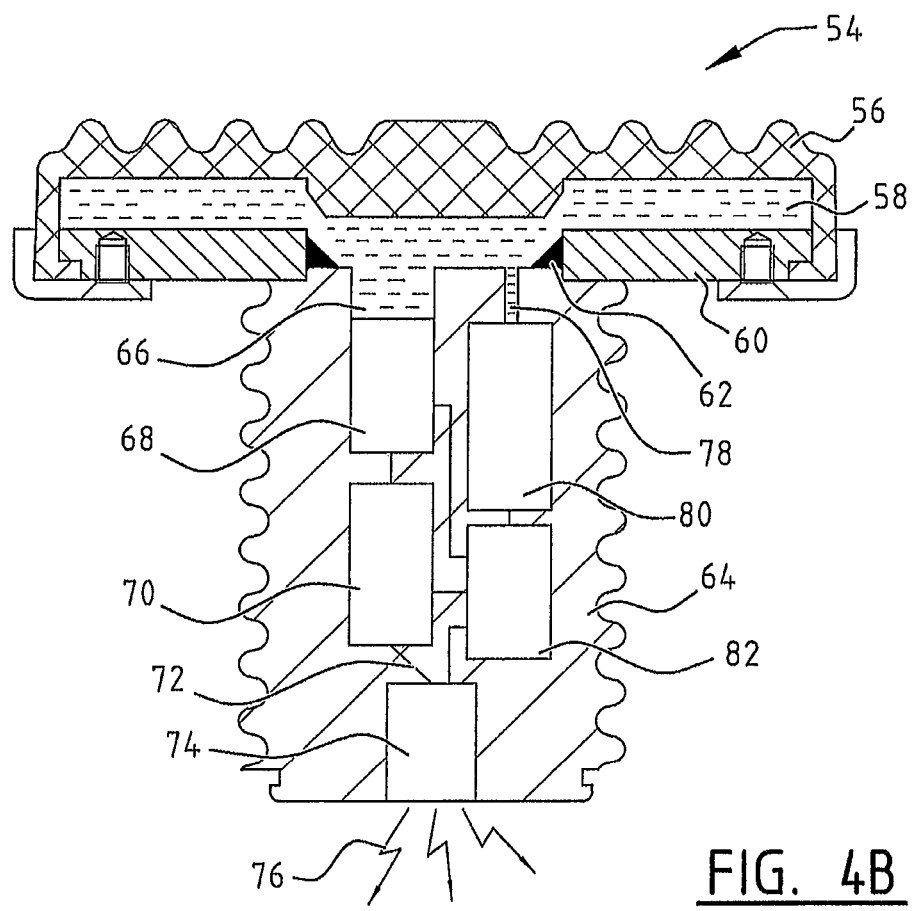

A sensor 54 (FIG. 4 A-B) comprises pressure plate 56. Below plate 56 an illustrated gel-pad 58 is provided that rests on a stationary plate 60. In the illustrated embodiment plate 60 is connected by weld 62 to housing 64. Channel 66 brings the gel of pad 58 into contact with pressure sensor 68. Processing module 70 determines the measurement signal 72. Transmitter 74 sends signal 76 representing the load acting on sensor 54. In the illustrated embodiment channel 78 brings gel of pad 58 into contact with power generator 80. The generated energy can be stored in power buffer 82 and used by transmitter 76.

In a presently preferred embodiment pressure sensor 68 comprises a thin film and/or semiconductor, power generator 80 comprises a piezo-element, and buffer 82 comprises a capacitor and/or a rechargeable battery.

When measuring a load of vehicle 6, carrying part 36 that is lifted by carrier 16 of lifting columns 4, 22, 42 receives an activation signal from controller 30 using transmitter/receivers 26, 28, 38, 40 for activating sensor 34, 46. Sensor 34, 46 performs the measurement and transfers the measurement data to controller 30 using the same or similar transmitter/receivers. The energy required for sensor 46 is in one of the illustrated embodiments of lifting column 42 provided by piezo-element 50 and capacitor 52. This obviates the need to provide additional cables for the measuring system. In another embodiment the energy required for sensor 46 is provided by electromagnetic means 54 that are preferably activated by controller 30.

In addition, controller 30 may perform additional tasks using the measurement signal including a check to prevent overweight. In case an overweight is established, controller 30 may prevent operation and more specific load lifting by lifting column 4, 22, 42. For example, when lowering a vehicle a load sensor may detect a small overload of column 4, 22, 42 such that controller 30 may stop the operation. Furthermore, controller 30 may check the correct positioning of vehicle 6 over a pair of lifting columns 4, 22, 42 of lifting system 24, 44. Also, controller 30 may provide an operator with a clearance signal if necessary and/or a warning signal in case of a problem.

Figure 2:
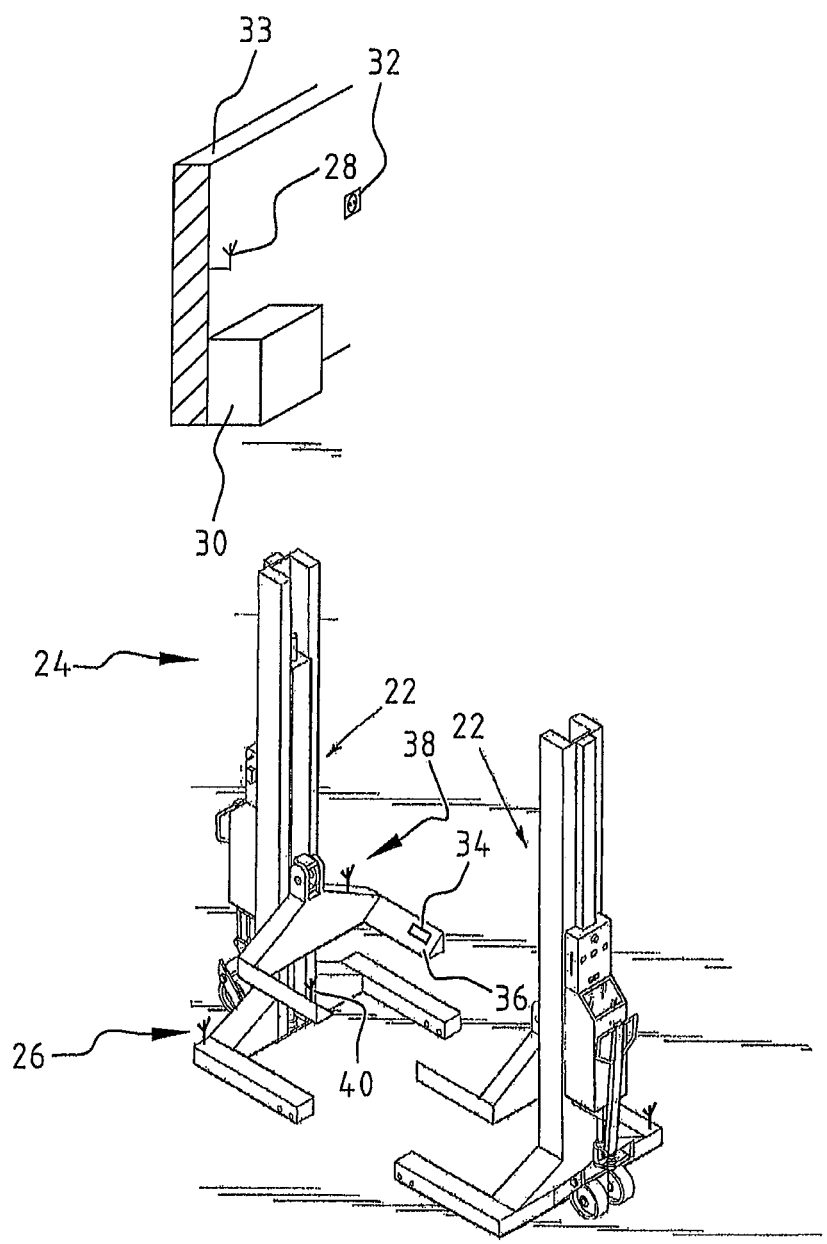
FIG. 2 shows a lifting column according to the invention.
Figure 3:
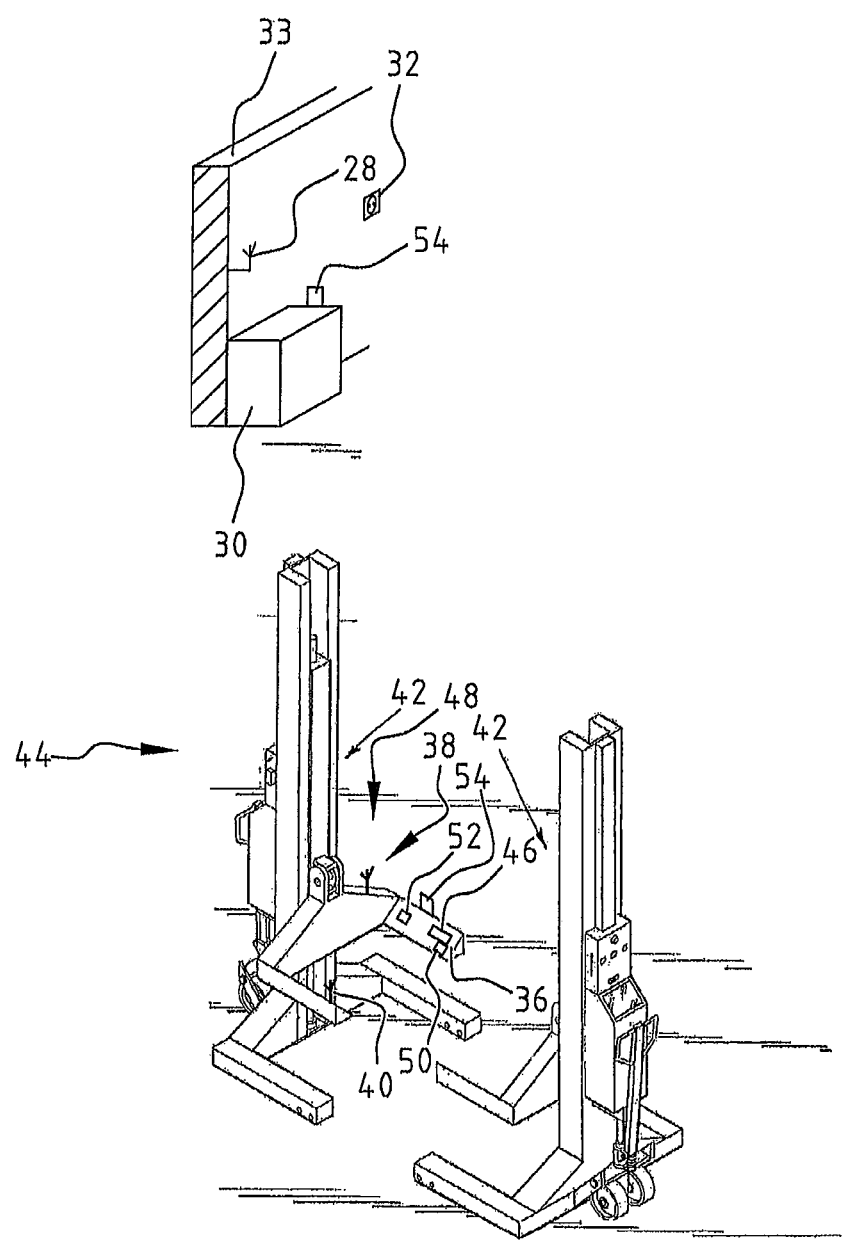
FIG. 3 shows an alternative embodiment of a lifting column according to the invention.

The present invention can be applied to the (wireless) lifting columns illustrated in FIGS. 1-3. Alternatively the invention can also be applied to other types of lifting columns and lifting systems.

Figure 5:
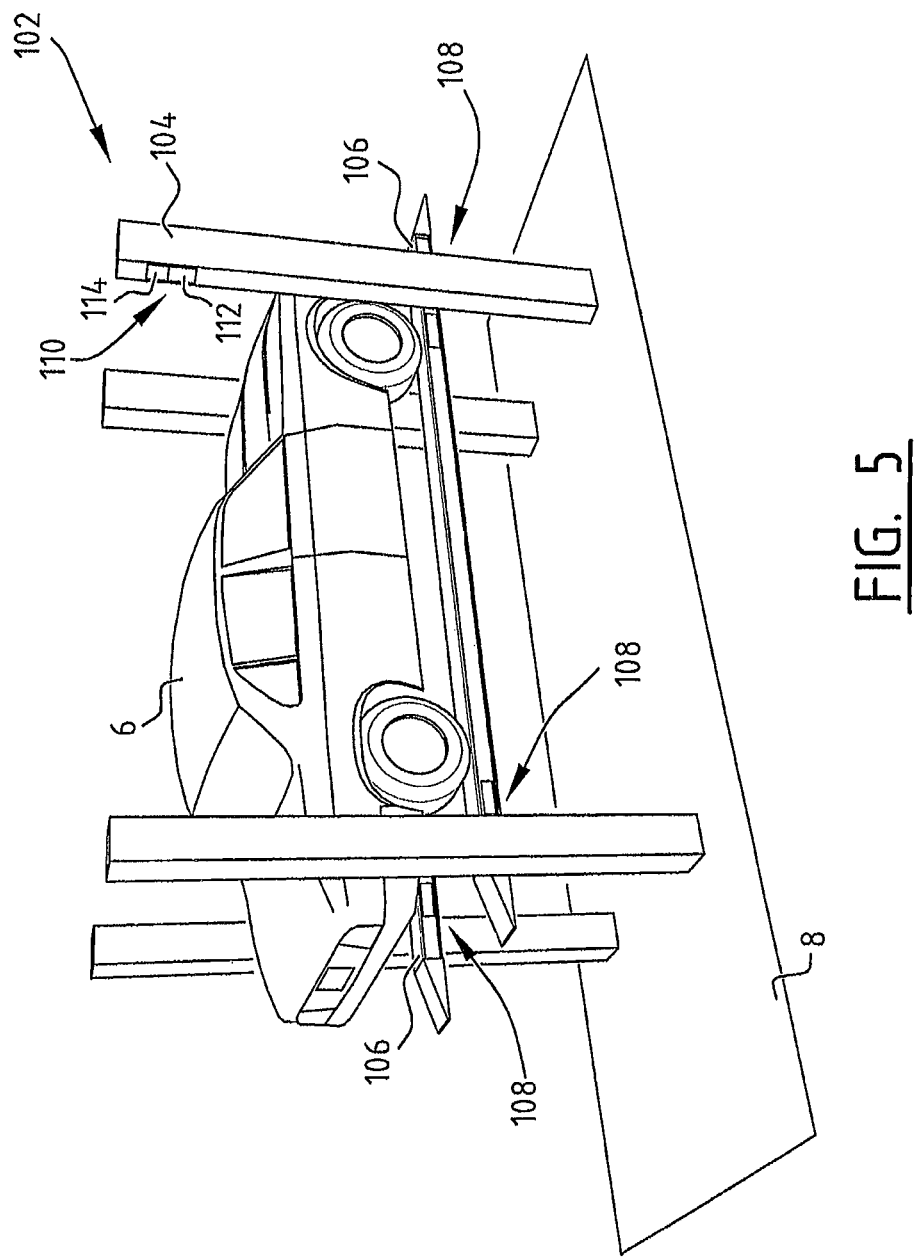
FIGS. 5-7 show alternative embodiments of lifting columns according to the invention.

For example, a four-post lifting system 102 (FIG. 5) comprises four columns 106 carrying runways 106. Columns 104 comprise a sensor 108, preferably each column 104 has one sensor 108. In the illustrated embodiment an indicator 110 with a green light 112 and a red light 114 is provided. Light 110 signals to the driver when vehicle 6 is positioned correctly relative to columns 104 and the vehicle 6 can be lifted. In case each column 104 is provided with sensor 108 the position of vehicle 6 on carriage way/carrier 106 can be checked. In addition, the individual load for a specific lifting column 104 can be checked. This contributes to the overall safety of the lifting operation. Furthermore, by preventing overloads to occur in practice columns 104 can be designed effectively thereby reducing costs.

Figure 6:
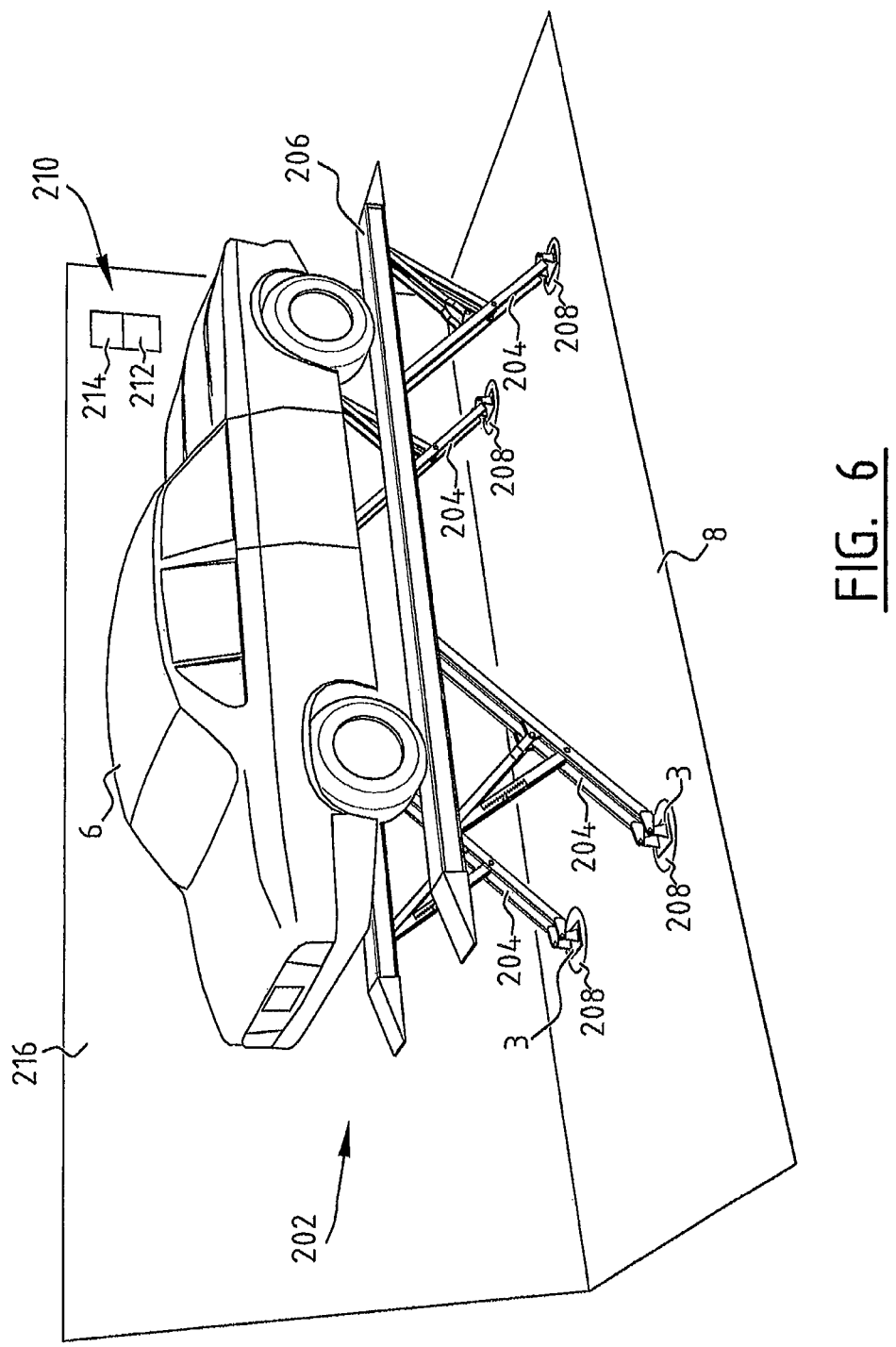

As a further example, lifting system 202 (FIG. 6) comprises a so-called sky-lift configuration with four posts 204 carrying runways 206. In the illustrated embodiment a sensor 208 is provided for every post 204. This enables the check on positioning of vehicle 6 and/or the individual loads acting on a post 204 as described earlier. A light 210 with green 212 and red 214 lights can be provided on wall 216 to indicate to the driver of vehicle 6 that the vehicle is positioned correctly or needs to be repositioned.

Figure 7:
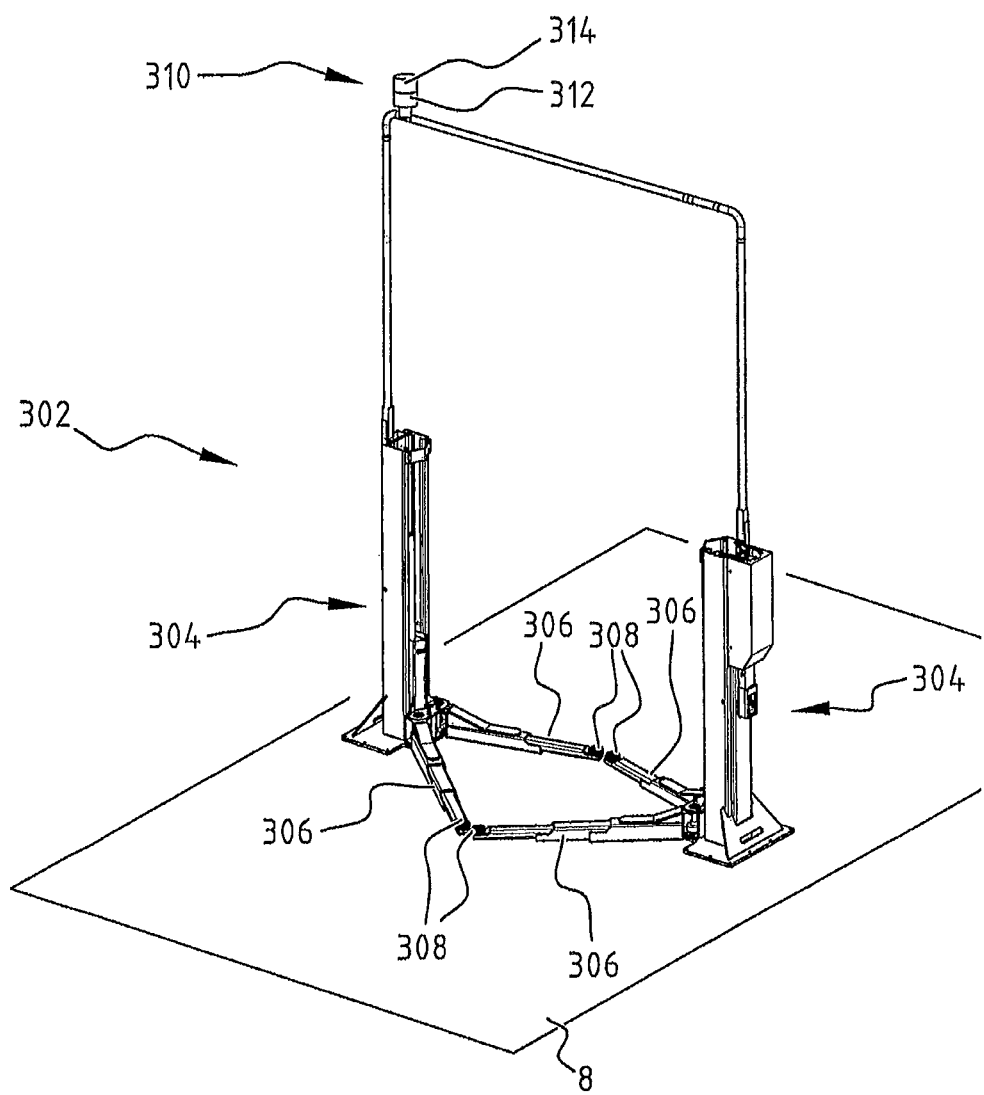

As an even further example, lifting system 302 (FIG. 7) comprises a so-called two-post configuration with two posts 304 that are provided with carrier arms 306. In the illustrated embodiment carrier arms 306 are provided with sensor 308. This enables the check on positioning of vehicle 6 and/or the individual loads acting on a post 304 as described earlier. A light 310 with green 312 and red 314 lights can be provided to indicate to the driver of vehicle 6 that the vehicle is positioned correctly or needs to be repositioned.

It will be understood that the invention can be applied to a range of lifting systems, including but not limited to four-post and two-post lifting columns, skylift, and mobile columns. Also, it will be understood that additional embodiments of the invention can be envisaged combining and/or switching features from the described and/or illustrated embodiments. For example, instead of light 110, 210, or in addition thereto, sound signals, indications on a control system etc. can be applied.

Providing signals, such as warning signals of an overload or misalignment of the vehicle, can be provided in numerous ways. This may involve the use of lights, sounds, visual indications on a display, such as a touch screen, of a lifting column, etc.

The present invention is by no means limited to the above described preferred embodiments. The rights sought are defined by the following claims within the scope of which many modifications can be envisaged. The present invention is described using a lifting column and more specifically a mobile lifting column and/or a lifting column of the two-post and/or four-post lift type. The invention can also be applied to other type of lifting columns such as so-called boom-lifts, scissor-lifts and loading platforms. Such lifting equipment can be provided with the measures illustrated above according to the invention.

The invention claimed is:

1. A lifting column for lifting a load, such as a vehicle, comprising:
   a) a frame with a movable carrier and a drive which acts on the carrier;
   b) control means for control of the drive;
   c) a carrying part attached to the carrier for carrying the load;
   d) weight measuring means attached to the carrying part for measuring the weight of the load; and
   e) communication means for communicating a measurement signal of the weight measuring means indicative of the weight of the load to the control means,
   wherein the weight measuring means comprises an energy supply, wherein energy for the energy supply originates from the vehicle to be lifted, and wherein the weight measuring means comprises a sensor comprising a pressure plate and a gel-pad comprising gel provided below the pressure plate.

2. The lifting column according to claim 1, wherein the communication means comprises a transmitter and receiver for wireless communication between the weight measuring means and the control means.

3. The lifting column according to claim 1, wherein the gel of the gel-pad contacts a pressure sensor and a power generator.

4. The lifting column according to claim 1, wherein the weight measuring means comprises a piezo-element for generating energy for the energy supply.

5. The lifting column according to claim 1, wherein the energy supply comprises an energy collector for storing the generated energy.

6. The lifting column according to claim 5, wherein the energy collector comprises a capacitor.

7. A lifting system comprising one or more lifting columns according to claim 1.

8. The lifting system according to claim 7, wherein the control means comprise safety means that are activated when the measurement signal indicates an overweight.

9. A load sensor for measuring a load on a lifting column and/or lifting system according to claim 1.

10. The load sensor according to claim 9, comprising an energy generator and/or an energy collector.

11. A method for measuring a load on a lifting column, comprising:
    a) providing a lifting system with a number of lifting columns and one or more load sensors according to any of the foregoing claims; and
    b) measuring the load.

12. The method according to claim 11, comprising checking the position of a vehicle relative to a lifting column.

\* \* \* \* \*